(12) United States Patent
Schroeder et al.

(10) Patent No.: US 10,808,792 B2
(45) Date of Patent: Oct. 20, 2020

(54) APPARATUS FOR SHIELDING VEHICLE COMPONENT

(71) Applicant: HONDA MOTOR CO., LTD., Tokyo (JP)

(72) Inventors: Dustin M. Schroeder, Raymond, OH (US); Shane R. Smith, Zanesfield, OH (US); Scott D. Batdorf, Raymond, OH (US)

(73) Assignee: HONDA MOTOR CO, LTD., Tokyo (JP)

( * ) Notice: Subject to any disclaimer, the term of this patent is extended or adjusted under 35 U.S.C. 154(b) by 180 days.

(21) Appl. No.: 16/039,127

(22) Filed: Jul. 18, 2018

(65) Prior Publication Data
US 2020/0025275 A1    Jan. 23, 2020

(51) Int. Cl.
| | |
|---|---|
| *F16F 9/38* | (2006.01) |
| *B60G 7/00* | (2006.01) |
| *F16D 3/84* | (2006.01) |
| *B60B 35/00* | (2006.01) |

(52) U.S. Cl.
CPC .............. *F16F 9/38* (2013.01); *B60G 7/001* (2013.01); *F16D 3/841* (2013.01); *B60B 35/006* (2013.01); *B60G 2204/416* (2013.01); *B60G 2204/43* (2013.01); *B60G 2206/10* (2013.01); *B60G 2206/8201* (2013.01)

(58) Field of Classification Search
CPC ..... F16F 9/38; F16D 3/841; B60G 2204/4308
See application file for complete search history.

(56) References Cited

U.S. PATENT DOCUMENTS

| | | | |
|---|---|---|---|
| 5,362,090 A | 11/1994 | Takeuchi | |
| 5,915,728 A * | 6/1999 | Blackburn | ............ B60B 35/166 180/346 |
| 6,692,366 B1 * | 2/2004 | Savant | ..................... F16D 3/841 464/170 |
| 7,624,835 B2 * | 12/2009 | Bowers | ..................... B62K 5/01 180/346 |

(Continued)

FOREIGN PATENT DOCUMENTS

| | | |
|---|---|---|
| CN | 105946486 A | 9/2016 |
| EP | 1612068 A1 | 1/2006 |

(Continued)

*Primary Examiner* — James A English
(74) *Attorney, Agent, or Firm* — Arent Fox LLP

(57) ABSTRACT

A shielding element for protecting at least one suspension and/or driveline component. The shielding element is connected to a suspension component. The suspension component extends in a first axial direction and includes a mounting portion at one end for mounting the suspension component to a vehicle. The suspension component further includes a second end for mounting the suspension component to a knuckle. The second mounting portion is capable of receiving a suspension mounting component, which may be or include a ball joint. The shielding element is located near the second mounting portion. The shielding element extends from a surface of the suspension component in a second direction different from the first direction. The portion of the protection element that extends in the second direction may protect at least one of the mounting point, the suspension mounting component, and the driveline component from contact with debris.

20 Claims, 10 Drawing Sheets

(56) References Cited

U.S. PATENT DOCUMENTS

| | | | |
|---|---|---|---|
| 8,328,212 B1 | 12/2012 | Dundon | |
| 8,333,526 B2 * | 12/2012 | Long | F16D 3/38 403/57 |
| 8,376,647 B2 | 2/2013 | Kuroda | |
| 8,402,878 B2 * | 3/2013 | Schreiner | B60G 3/20 296/187.07 |
| 8,764,039 B2 * | 7/2014 | Keller | B60G 3/202 280/124.128 |
| 2005/0167179 A1 * | 8/2005 | Hasegawa | B60G 3/20 180/348 |
| 2008/0179853 A1 * | 7/2008 | Kuwabara | B60G 7/001 280/124.134 |
| 2015/0210234 A1 * | 7/2015 | Kuwabara | B60G 3/20 180/346 |
| 2016/0089944 A1 * | 3/2016 | Kuwabara | B60G 7/001 280/124.134 |
| 2017/0197487 A1 | 7/2017 | Langworthy et al. | |

FOREIGN PATENT DOCUMENTS

| | | |
|---|---|---|
| JP | H07323713 A | 12/1995 |
| JP | 2001315517 A | 11/2001 |
| JP | 2006248256 A | 9/2006 |

* cited by examiner

APPARATUS FOR SHIELDING VEHICLE COMPONENT

FIELD OF THE INVENTION

Aspects of the present disclosure relate generally to an apparatuses for guarding a suspension and/or drivetrain component and specifically for protecting drivetrain and/or suspension components of a vehicle from damage due to contact with debris and/or other objects which may be encountered during use of the vehicle.

BACKGROUND

During operation of a vehicle either on or off-road, road debris and other foreign materials may be encountered by the vehicle and may contact various components of the vehicle. Portions of both the driveline and suspension may be susceptible to wear and/or damage due to the prolonged contact with debris over the lifetime of the vehicle. For example, excessive wear and/or damage may reduce reliability of the vehicle. While certain components, for example a driveshaft or driveline component, can fail and may allow a user to continue to temporarily use and/or temporarily repair the vehicle for use over short distances, the failure of other components may result in the vehicle being immobile. Accordingly, the inventors recognized the need to provide cost-effective methods of and devices for protecting various components of the driveline and/or suspension of the vehicle to reduce or prevent damage to components and improve reliability of the vehicle.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, a protective shield for a vehicle suspension is disclosed. The protective shield may include an attachment portion attachable to a vehicle suspension component. The vehicle suspension component may extend in an axial direction from a first end to a second end. The protective shield may include at least one shield portion attached to the attachment portion that extends laterally relative to the axial direction of the suspension component. The shield portion may include a first planar component extending from the attachment portion and a second component that is shaped to form a cavity, and a surface opposite the cavity. The cavity may face a protected component so that the surface opposite the cavity directs flow and objects away from the cavity.

In accordance with another aspect of the disclosure, a suspension component is disclosed. The suspension component may include a first mounting portion for mounting the suspension component to a vehicle at a first end of the suspension component. The suspension component may further include a second mounting portion the second end of the suspension component for mounting the suspension component to the knuckle. Further, the suspension component may include a protective shield formed with or attached to the suspension component and located so as to shield the second mounting portion of the suspension component. The protective shield may include an attachment portion attachable to the vehicle suspension component and at least one shield portion attached at the attachment portion. The shield portion may extend laterally relative to the axial direction of the suspension component. The shield portion may include a concave surface extending from the attachment portion and a convex surface opposite the concave surface. The concave surface may face the second mounting portion so as to direct flow and objects away from the concave surface side of the second component.

In accordance with another aspect of the disclosure, a vehicle having a rear suspension and a driveline is disclosed. The rear suspension may comprise a knuckle and a trailing arm that extends in an axial direction. The trailing arm may include a first mounting portion for mounting a suspension component to the vehicle at a first end of the trailing arm. The trailing arm may further include a second mounting portion at a second end of the trailing arm for mounting the trailing arm to the knuckle. The trailing arm may further include a protective shield formed with or attached to the trailing arm and located so as to shield the second mounting portion. The protective shield may include an attachment portion attachable to the trailing arm and at least one shield portion attached to the attachment portion and extending laterally relative to the axial direction of the trailing arm. The shield portion may include a concave surface extending from the attachment portion and a convex surface opposite the concave surface. The concave surface may be configured to face the second mounting portion so that the convex surface directs flow and objects away from the concave side of the second component.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DEFINITIONS USED THROUGHOUT THE SPECIFICATION

The following includes definitions of selected terms employed herein. The definitions include various examples and/or forms of components that fall within the scope of a term and that may be used for implementation. The examples are not intended to be limiting.

Example aspects of a method, device, and/or system in accordance with aspects of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

DETAILED DESCRIPTION

Figure 1:
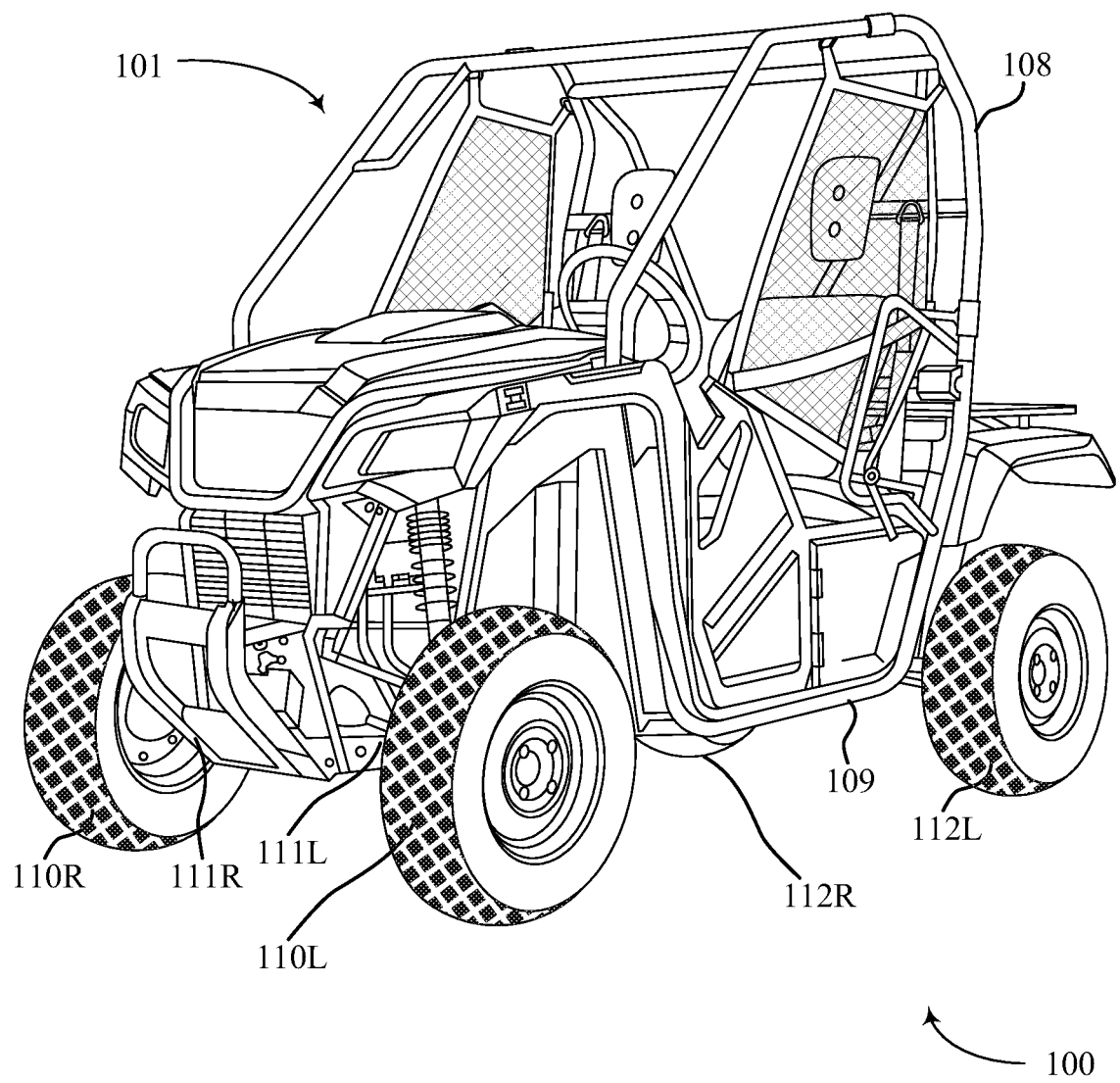
FIG. 1 is a left side perspective view of one example of a vehicle which may include a protection device in accordance with an aspect of the disclosure.

FIG. 1 illustrates an example embodiment of a vehicle 100 that can include various suspension and drivetrain components in accordance with the principles of the disclosed subject matter. The vehicle 100 shown in FIG. 1 may be specialized for use on an unimproved path or on an unmarked path, for example, and may be referred to as a multipurpose utility vehicle (MUV) or as a side-by-side all-terrain vehicle (SxS), or (SxS ATV). However, the suspension and/or drivetrain protection elements disclosed may be used with any vehicle that is configured for travel along any one or combination of improved, unimproved, and unmarked paths. For example, embodiments are intended to include or otherwise cover any type of vehicle or automobile, including a passenger car, minivan, truck, other types of all-terrain vehicles (ATV), semi-tractor, off-highway vehicle, etc.

The vehicle 100 may include, among other components, a body 101, a pair of front wheels and tires, 110R, 110L a pair of rear wheels and tires 112L, 112R, a roll cage 108, a frame assembly 109, a pair of front suspension assemblies 111R, 111L, a pair of rear suspension assemblies, and a powertrain. The rear suspension assemblies and the powertrain are hidden from view in FIG. 1 by the body 101; further details of these features are discussed with reference to FIGS. 2-9. The frame assembly 109 may include the roll cage 108. As will be discussed in further detail below, the frame assembly 109 may accommodate suspension and drivetrain components connected to each rear wheel 112R, 112L of the vehicle 100.

Figure 2:
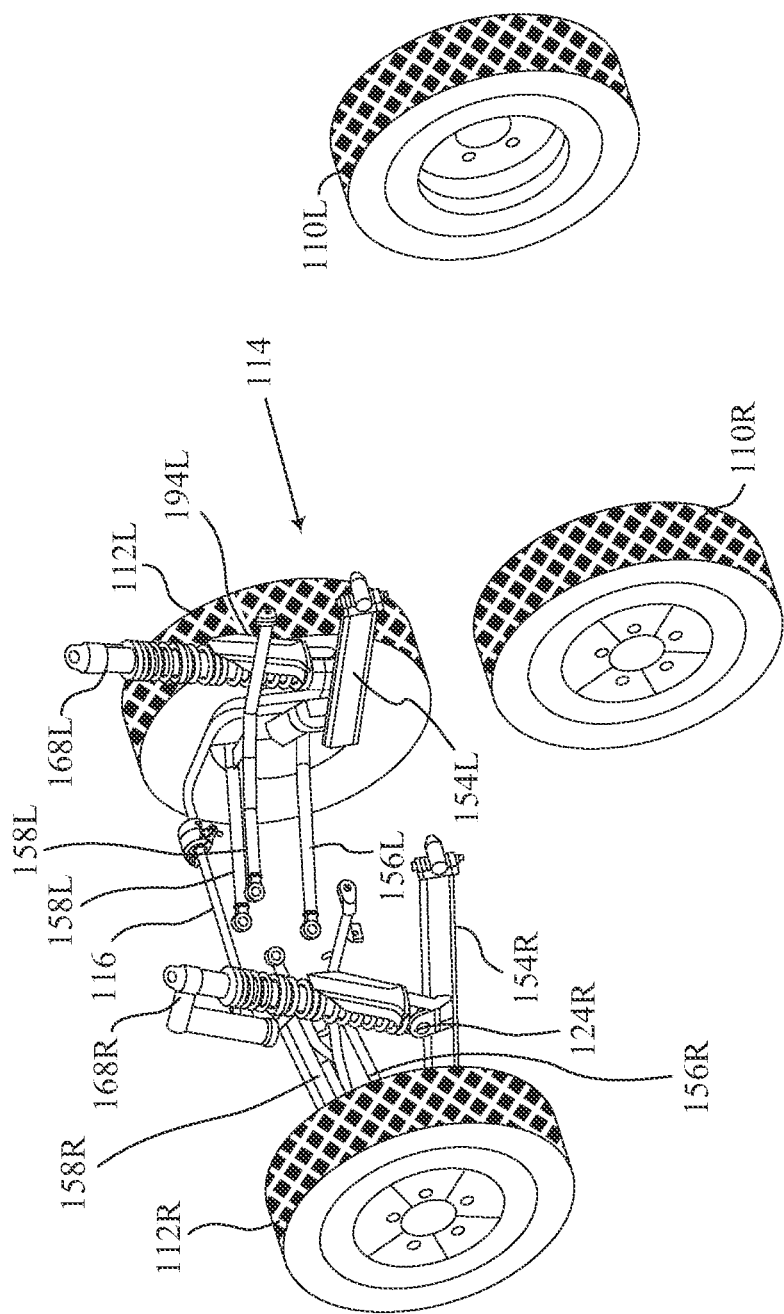
FIG. 2 is see-through right side perspective view of an example of suspension components in accordance with an aspect of the disclosure.

FIG. 2 is an example view of various rear suspension components that may be used, for example, with the vehicle 100 in FIG. 1. It is noted that other components of the vehicle 100 are omitted from the view of the components in FIG. 2 merely for ease of view. For example, the driveline is omitted from FIG. 2. As shown in FIG. 2, the rear suspension assembly 114 may be connected to the frame assembly 109 (shown in FIG. 1) at the left rear and right rear of the vehicle 100 (FIG. 1). Further, for each of the components shown in FIG. 2 that may be included on both the left side and right side of the vehicle, such components have been designated with corresponding reference numbers may be designated as left (L) or right (R) in views that show both sides of the suspension and may include only the reference number for views that show only a single side of the suspension.

Figure 3:
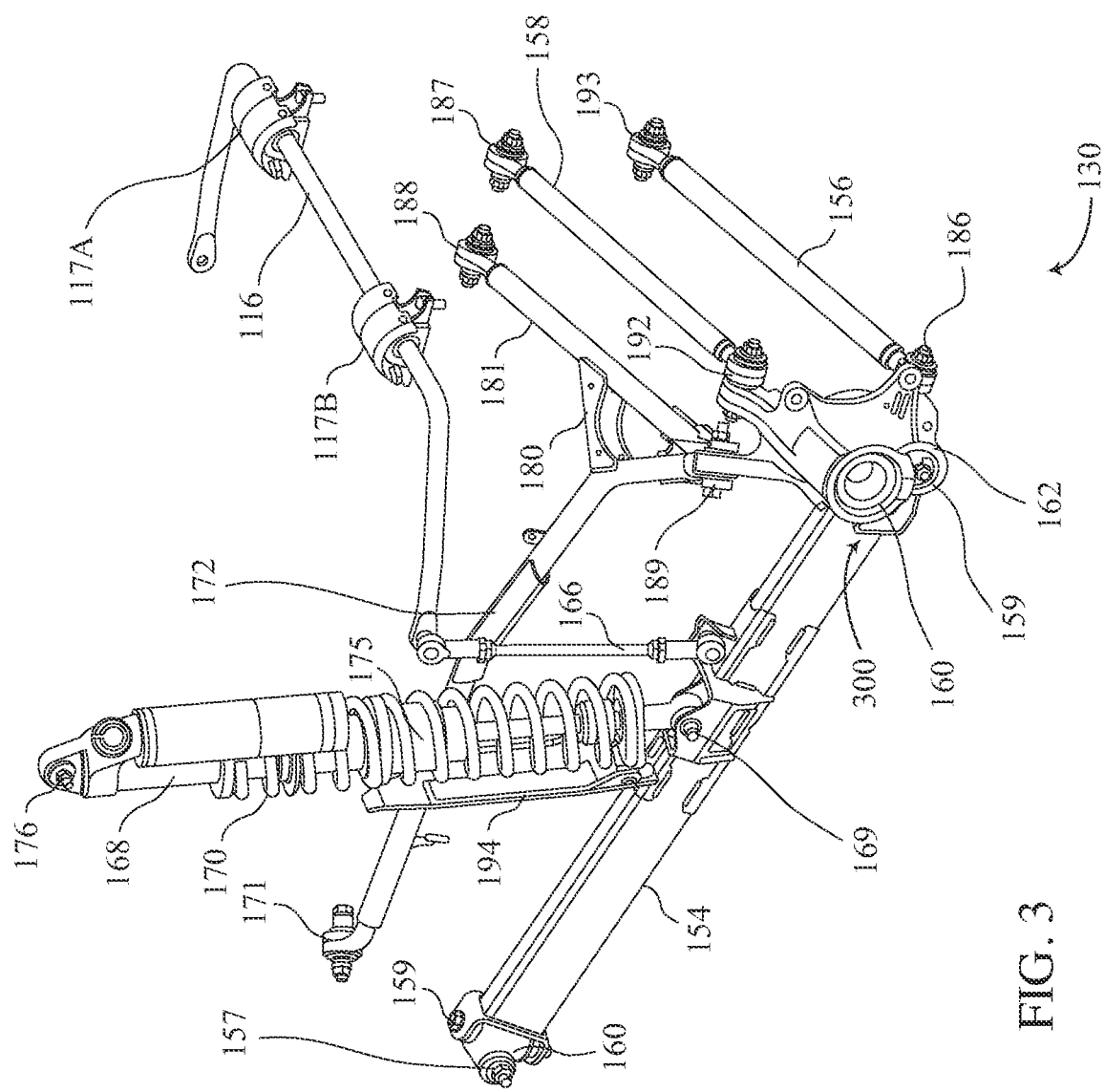
FIG. 3 is a see-through left side perspective view of the left rear suspension components of FIG. 2 in accordance with an aspect of the disclosure.

The suspension assembly shown in FIG. 2 may be referred to as a 4-link suspension assembly. The 4-link suspension assembly may include a plurality of links 154R, 154L, 156R, 156L, 158R, 158L, totaling four per side. FIG. 3 shows a close up view of various left rear suspension components 130 of the rear suspension assembly 114 shown in FIG. 2. With reference to FIG. 2 3, the suspension may include a wheel hub 160, a knuckle 162, a stabilizer bar 116 (also referred to interchangeably herein as an anti-roll bar or sway bar), a connecting link 166, and a coilover 168. The suspension components may include a trailing arm 154, for example, may extend from a first mounting location 157, which may be mounted to the frame assembly 109 (FIG. 1) at a second mounting location 159; the trailing arm 154 may further have a knuckle 162 at an end opposite the mounting location 159. The lower trailing arm 154 may be mounted to the frame 109 (FIG. 1) at the first mounting location 157 via a pivot assembly 160. While a pivot assembly 160 is shown in FIG. 3, the lower trailing arm 154 may also be connected to the frame assembly at the first mounting location 157 via any suitable additional features, such as but not limited to a ball joint or mechanical fasteners (with or without bushings) that may permit at least one degree of freedom of movement of the lower trailing arm 154 relative to the frame assembly 190 (FIG. 1). The lower trailing arm 154 may be connected to the knuckle 162 via a mounting component 200, which may be or include a ball joint, or any other appropriate component, such as but not limited to a mechanical fastener (with or without bushings) that may permit movement of the lower trailing arm 154 relative to the knuckle 162.

A lower lateral link 156 may extend from, for example, a knuckle lower link mount 186 to a frame side lower link mount 193, which may attach to the frame assembly 109 (FIG. 1). The lower lateral link 156 may be connected to the frame assembly 109 (FIG. 1) and the knuckle 162 in any appropriate manner, such as, but not limited to use of mechanical fasteners (with or without bushings) that may permit at least one degree of freedom of movement of the lower lateral link 156 relative to each of the frame assembly 109 (FIG. 1) and the knuckle 162. The upper lateral link 158 may extend from a knuckle upper link mount 192 to a frame side upper link mount 187, which may connect to the frame assembly 109 (FIG. 1). The upper lateral link 158 may be connected to the frame assembly 109 (FIG. 1) and the knuckle 162 in any appropriate manner, such as, but not limited to use of one or more mechanical fasteners (with or without bushings) that may permit at least one degree of freedom of movement of the upper lateral link 158 relative to each of the frame assembly 109 (FIG. 1) and/or the knuckle 162.

Each of the left and right rear suspension may further include an upper trailing arm 172 that may extend from an upper trailing arm knuckle mount 189 to an upper trailing arm frame mount 171. The upper trailing 172 may be connected to the frame assembly 109 (FIG. 1) in any appropriate manner, such as, but not limited to use of one or more mechanical fasteners (with or without bushings) that may permit at least one degree of freedom of movement of the upper trailing arm 172 relative to the frame assembly 109 (FIG. 1). The upper trailing arm 172 may further include a toe control portion 181, which may be connected to the frame assembly 109 (FIG. 1) via a toe control frame mount 188. The toe control portion 181 may be connected to the frame assembly 109 (FIG. 1) in any appropriate manner, such as, but not limited to use of one or more mechanical fasteners (with or without bushings) that may permit at least one degree of freedom of movement of the upper toe control portion 181 relative to the frame assembly 109 (FIG. 1). The toe control portion 181 may also be connected to the upper trailing arm 172 at a location proximal to the upper trailing arm knuckle mount 189. The upper trailing arm 171 and the toe control portion 181 may further be connected to one another via gusset 180. Both the upper trailing arm 172 and the toe control portion 181 may be connected to the knuckle 162 via the upper trailing arm knuckle mount 189 in any appropriate manner, such as, but not limited to use of one or more mechanical fasteners (with or without bushings) that may permit at least one degree of freedom of movement of the upper trailing arm 172 and toe control portion 181 relative to the knuckle 162. Further, as an alternative, the upper trailing arm 172 and the toe control portion may be separate components that connect to knuckle 162 at separate locations, for example.

As mentioned above, the components of the rear suspension 114 may further include a stabilizer bar 116 that may be connected to the frame assembly 109 (FIG. 1) via sway bar mounts 117A and 117B, for example. The stabilizer bar 116 may also be connected to the trailing arm 154 by a connecting link 166 that may connect an end of the stabilizer bar 116 to a location on the trailing arm 154 near the coilover mount 169. The stabilizer bar 116 may extend in the transverse direction from the left rear suspension assembly to the right rear suspension assembly. Because the stabilizer bar 116 is connected to the trailing arms 154 of both rear suspension assemblies, the stabilizer bar 116 may limit roll of the frame assembly 109 (FIG. 1).

The coilover 168 may include a coil spring 170 and a dampener 175 (also referred to herein as a shock absorber or shock) extending inside of the coil spring 170. The coilover 168 may extend from the lower coilover mount 169 on the lower trailing arm 154 to the upper coilover mount 176, which may in turn be mounted to the frame assembly 109 (FIG. 1). The coilover 168 may be connected to both the frame 109 (FIG. 1) and the trailing arm 154 in any appropriate manner, such as, but not limited to use of mechanical fasteners (with or without bushings) that may permit at least two degrees of freedom of movement of the coilover 168 relative to each of the frame assembly 109 (FIG. 1) and the trailing arm 154. The coilover 168 may include a dampener protector 194, which may be mounted to the portion of the coilover 168 that faces the front of the vehicle 100, for example.

Although FIGS. 2 and 3 show the coilover 168 connected to approximately the midpoint of the trailing arm 154, the current disclosure is also intended to include or otherwise encompass the coilover 168 being mounted to any appropriate suspension member, such as, but not limited to the knuckle 162 or at any point along the length of the trailing arm 154. Further, the suspension may include a separate spring and dampener instead of utilizing a coilover 168 that includes both the spring and the dampener.

The vehicle 100 of FIG. 1 may further include a power source and a transmission (not shown) configured to drive the front wheels 110L, 110R and/or the rear wheels 112L, 112R. The power source and the transmission may be mounted on the frame assembly 109. The power source may be an internal combustion engine, an electric motor, or a hybrid of an internal combustion engine and an electric motor, for example. The power source (configured as an internal combustion engine or a hybrid power source) may have an engine output axis that is oriented in the longitudinal direction L or in the traverse direction T of the vehicle. The power source may be connected to the wheel(s) via a transmission. The transmission may be an automatic transmission, a manual transmission, or a semi-automatic transmission. The transmission may include an input shaft and an output shaft, for example. The output shaft of the transmission and/or the power source may be coupled to a transfer case for transferring power from the transmission to all four wheel. The vehicle 100 may further include at least one of a final gear assembly, a spool assembly, and/or a differential gear assembly. A differential assembly may permit one wheel connected to the differential to be driven at a different speed than another wheel connected to the transmission. The transmission, transfer case, and/or the differential may be contained in a common housing and/or encompassed in individual separate housings. The combination of the transmission, differential and/or transfer case may be interchangeably referred to herein as a transaxle.

Figure 10:
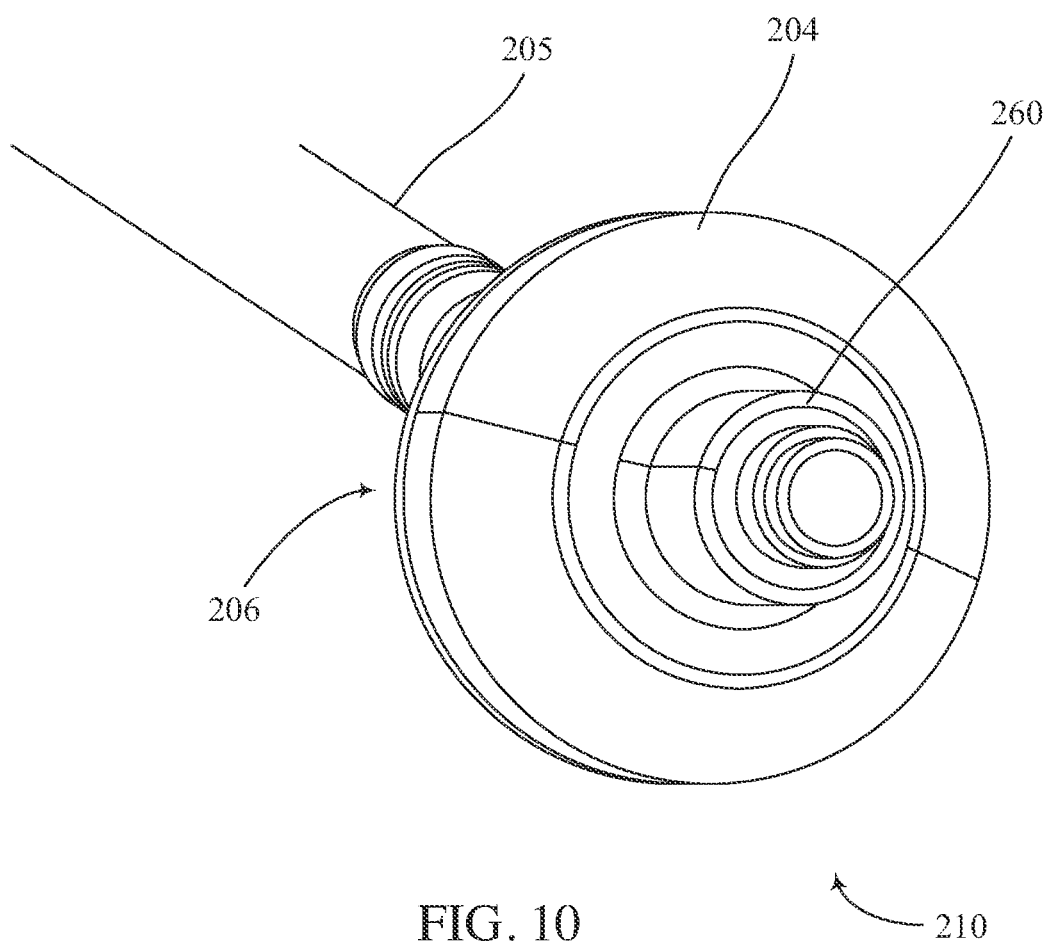
FIG. 10 is a close-up perspective view of a portion of the driveline in accordance with one aspect of the disclosure.

Any of the abovementioned components may be connected to each one of the wheels 110L, 110R, 112L, and/or 112R via a power transmission shaft. An example power transmission shaft 210 is shown in FIG. 10. The power transmission shaft 210 may connect any one of the appropriate driveline components mentioned above (e.g., a transaxle, a final gear assembly, a spool assembly, a differential, a motor) to at least one of wheels 110L, 110R, 112L, and/or 112R. As shown in FIG. 10, the power transmission shaft 210 may include an input shaft 205, which may in turn be connected to an output shaft 260 via a joint 206. The joint 206 may allow movement of the input shaft 205 relative to the output shaft 260 while still allowing torque to be transferred from the input shaft 205 to the output shaft 260. The joint 206, may for example be constant velocity ("CV") joint. The joint 206 may be covered with a boot 204 that may function to protect the joint 206 from contaminants and/or to contain a lubricant (e.g., grease) within the boot 204 so that the joint 206 remains lubricated. The boot 204 may be formed of a flexible material, which may for example include any one of a rubber, neoprene, plastic, and/or silicone. The input shaft 205 may for example be further connected (e.g., at an end opposite the end of the input shaft 205 connected to the joint 206) to a driveline component. The output shaft 260 may be connected to a wheel through the wheel hub 160 in the knuckle 162.

Figure 4:
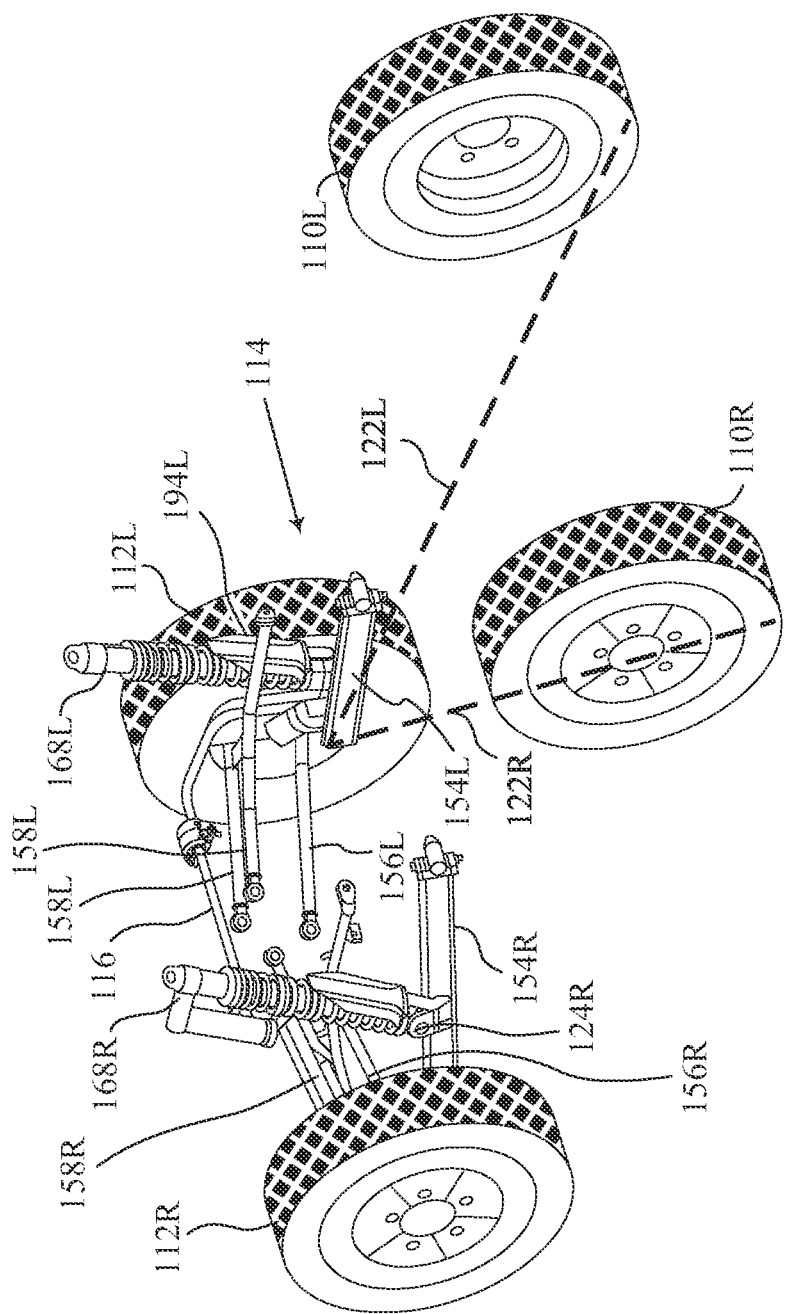
FIG. 4 is a see-through right side perspective view of the example suspension components in FIG. 2 with sight lines showing possible paths along which debris may be flung by the font tires.
Figure 5:
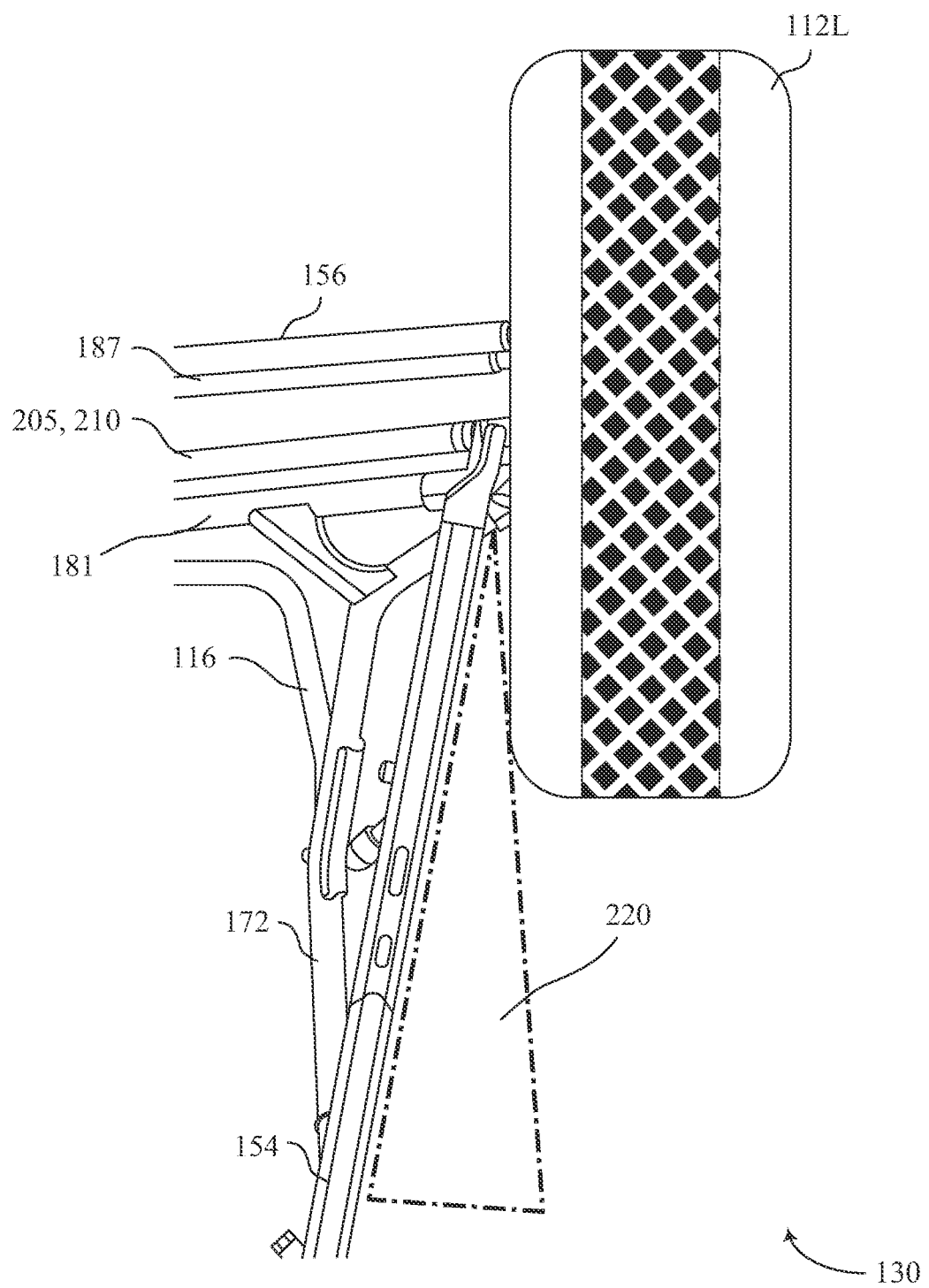
FIG. 5 is a bottom view of the right rear suspension components of FIGS. 2 and 3 in accordance with an aspect of the disclosure.
Figure 6:
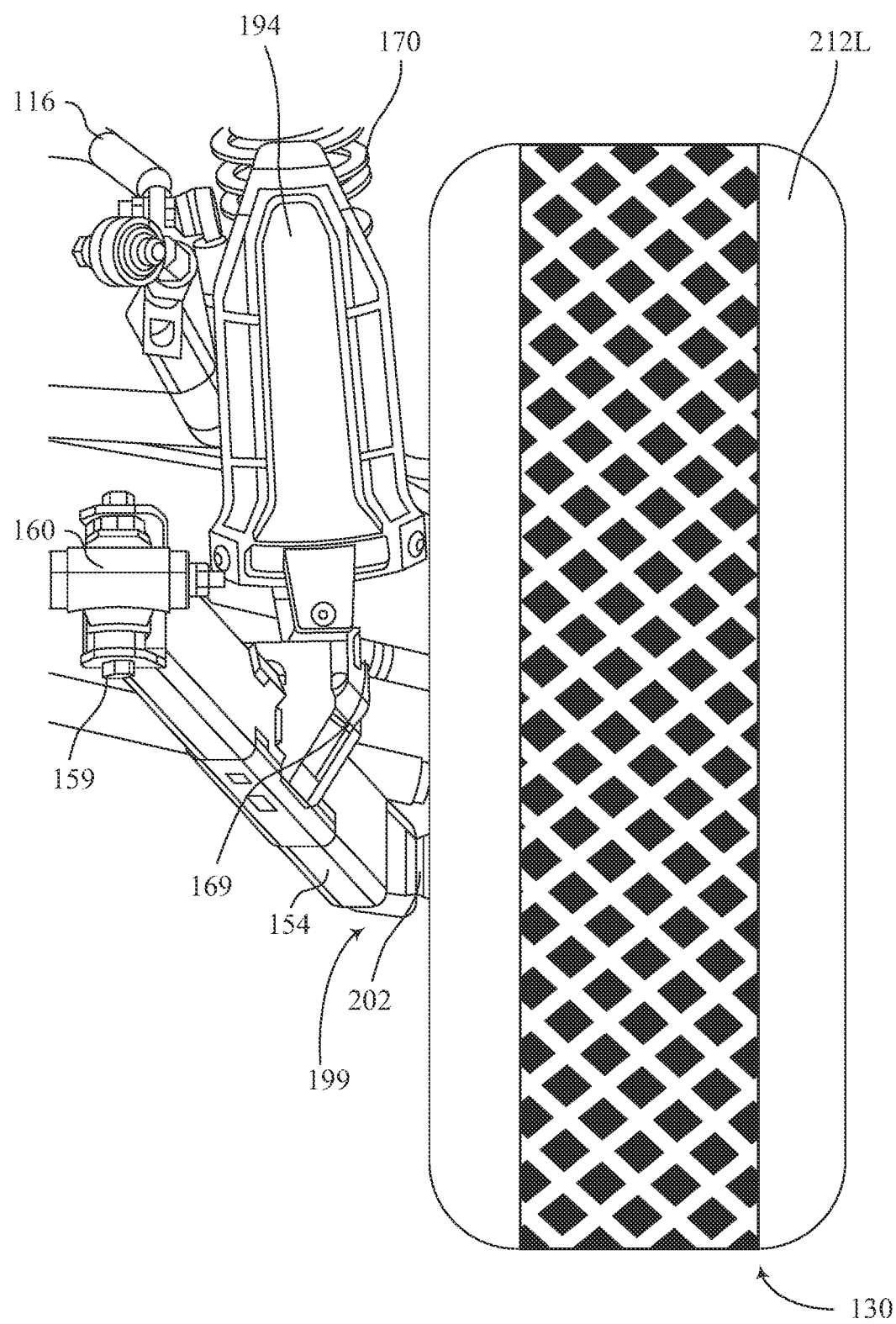
FIG. 6 is a see-through front view of the left rear suspension components of FIGS. 2-5 in accordance with an aspect of the disclosure.
Figure 7:
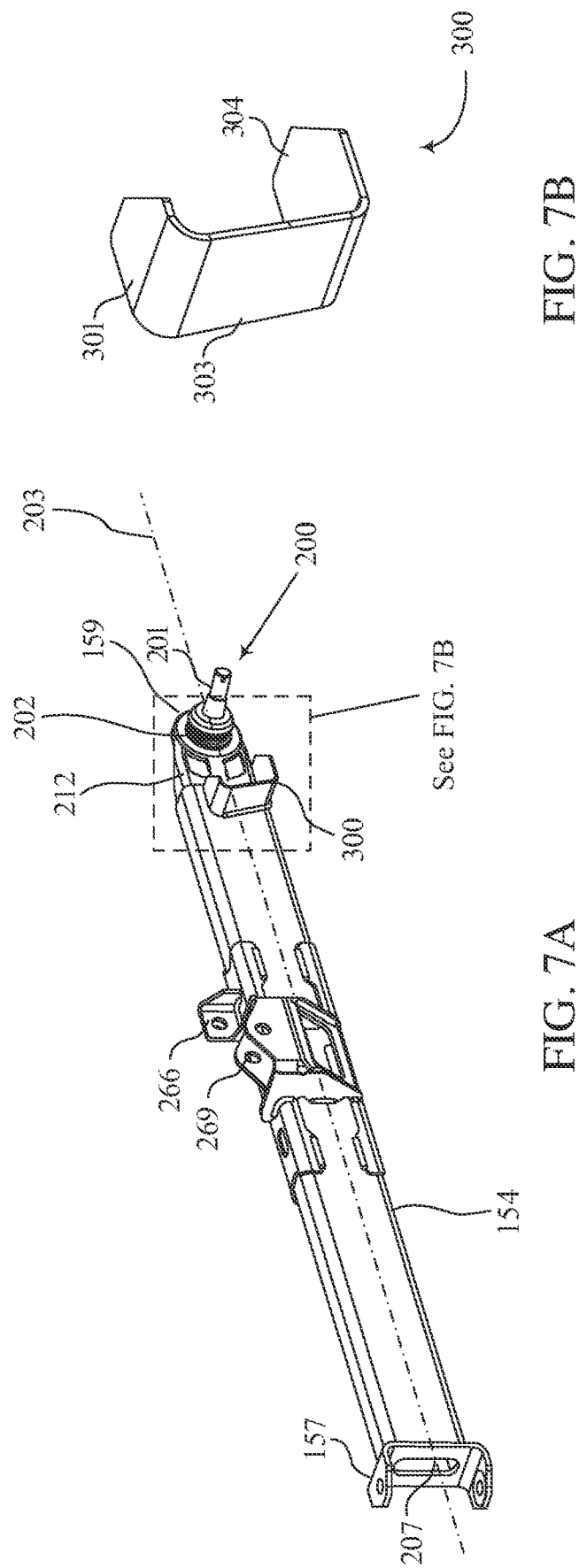
FIGS. 7A-B are one example of a suspension component in accordance with an aspect of the disclosure.

As shown in FIG. 4, front wheels 110R and 110L may be oriented so that debris and/or other foreign objects may be flung or projected towards the rear suspension and/or driveline components along left sight line 122L and right sight line 122R. During use, the above-mentioned debris and/or foreign objects may strike one or more portions of the suspension and/or driveline components, potentially causing damage thereof. As shown in FIGS. 5 and 6, debris, and/or environmental objects (e.g., branches, twigs, stones) may also be funneled by portions of the frame, body of the vehicle, and/or other components of the vehicle into the area shown as reference 220 and guided towards the lower portion of the suspension 199 (FIG. 6). Thus, components located near the lower portion of the suspension may be subject to damage due to the abovementioned foreign objects. One example of a suspension component that may be subject to damage, as shown in FIG. 5 is the connection between the trailing arm 154 and the knuckle 162 at the second mounting location 159 (FIG. 3) of the trailing arm. As shown and described with respect to FIG. 3, the trailing arm 154 may be connected to the knuckle 162 in any appropriate manner, such as but not limited to a mechanical fastener (with or without bushings) that may permit movement of the lower trailing arm 154 relative to the knuckle 162. One example of a mechanical fastener used to connect the trailing arm 154 to knuckle 162 at the second mounting location 157 is a mounting component 200, which may for example be or include a ball joint 202 as shown in FIG. 7A.

FIG. 7A is a perspective view of suspension component such as a trailing arm 154, as discussed with reference to FIGS. 2-6. The trailing arm 154 may extend along an axis 203 and may include a first mounting portion 157, which as may in turn mount to the frame assembly 109 (FIG. 1) of the vehicle 100 (FIG. 1). The trailing arm 154 may further include a coilover mounting portion 269 and a sway bar connecting link mount 266. The trailing arm 154 may be mounted to the knuckle 162 (FIG. 3) via ball joint 202. The ball joint 202 may include a mounting shaft 201, which may be threaded to accept a mounting nut (not shown). The ball joint 202 may be covered with a rubber boot. The rubber boot may function to protect the ball joint from contaminants and/or to contain a lubricant (e.g., grease) within the boot so that the ball joint 202 remains lubricated. The trailing arm 154 may further include a protection element 300 (which may be interchangeably referred to throughout the disclosure, as a protective shield) located near the location of the ball joint 202. The protection element 300 may extend from a surface of the trailing arm 154 in a manner and direction so as to block debris that may be encountered at the lower portion of the suspension 199 (FIG. 6). In one example, the protection element may include a mounting portion for connecting the protection element 300 to the trailing arm 154. The protection element 300 may extend laterally relative to an axis 203 of the trailing arm 154. Further, the protection element may include at least one shield portion attached at the attachment portion, the shield portion may include a concave surface extending from the attachment portion and a convex surface opposite the concave surface. The concave surface and convex surface opposite the concave surface may include a first substantially flat planar surface 303, a second substantially flat planar surface 301, and a third substantially flat planar surface 304. The first substantially flat planar surface 303 may be substantially perpendicular to both the second substantially flat planar surface 301 and the third substantially flat planar surface 304.

Figure 9:
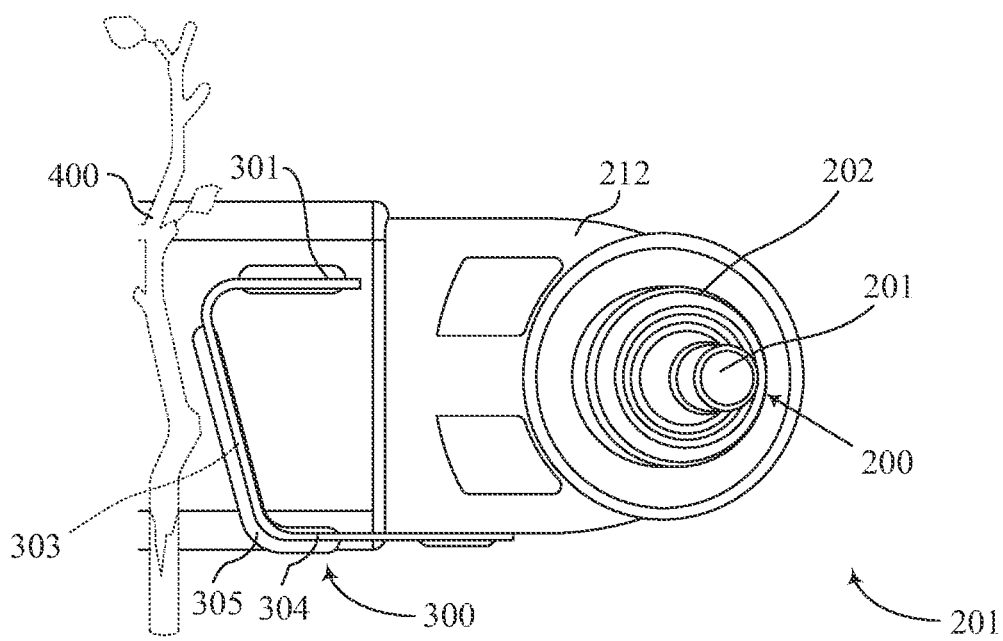
FIG. 9 is a close-up side-view of the suspension component in in FIGS. 7A-B and 8 in accordance with an aspect of the disclosure.

The protection element 300 may protect the ball joint 202 at the lower portion of the suspension 199 (FIG. 6) from direct contact with debris (e.g., a ground extending object, such as shown by reference 400 in FIG. 9), which may be funneled from area 220 shown in FIG. 5 toward the ball joint 202 (FIG. 7A). The protection element 300 may also be positioned to protect the ball joint 202 from contact with debris that may be flung towards the lower portion of the suspension by tires 110R and 110L along paths 122L and 122R as shown in FIG. 4, for example.

As shown in FIG. 7B, the protection element 300 may include a first portion 303 that may provide a first protective surface oriented toward the front of vehicle so as to provide a shield with regard to possible impacts when the vehicle is driven in a forward direction. The protection element 300 may further include a second portion 301 that is substantially perpendicular to the first portion 303, and a third portion 304 that is substantially parallel to the second portion 303 and substantially perpendicular to the first portion 303.

The protection element 300 may also at least partially protect joint 206 (FIG. 10), and more particularly the boot 204 (FIG. 10) from direct contact with debris and/or other objects that may be flung towards or come into contact with the lower portion of the suspension 122L and 122R as shown in FIG. 4, for example. In one example implementation, the protection element 300 of FIG. 7B may be located on the vehicle 101 (FIG. 1) so as to at least partially protect the joint 206 (FIG. 10) near the lower portion of the suspension 199 (FIG. 6) from direct contact with debris and/or other object that may be funneled into or near area 220 shown in FIG. 5 toward joint 206 (FIG. 10).

Figure 8:
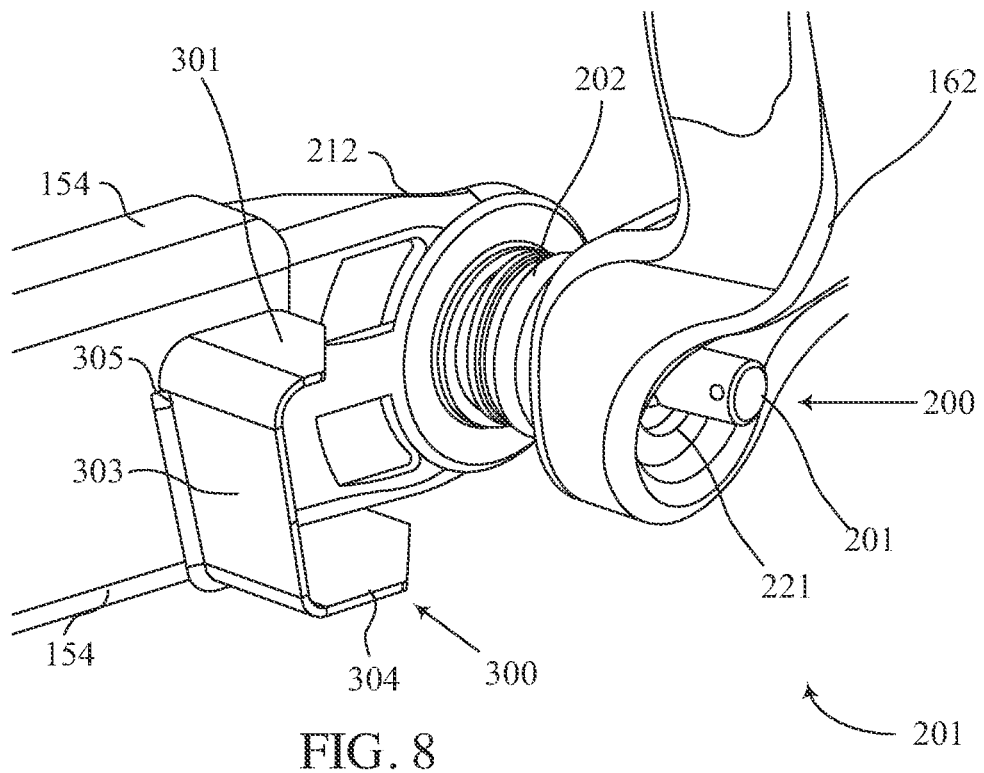
FIG. 8 is a perspective close-up view of the suspension component as shown in in FIGS. 7A-B interfaced with a knuckle in accordance with an aspect of the disclosure.

As shown in FIG. 8, the protection element 300 may be welded to the trailing arm 154 at weld portion location 305. However, it is noted that the current disclosure is not limited to a welded protection element 300. For example, the protection element 300 may be brazed, glued, bolted, riveted, pinned, and/or connected using any other suitable fastening method or apparatus known in the art. Further, the protection element 300 may be formed with and/or as part of the trailing arm 154 either through stamping or additive manufacturing, for example. The protection element 300 may be formed of any suitable known material that is at least semi-rigid. For example, the protection element may be made of or comprise steel, aluminum, steel or aluminum alloy, plastic, a composite, carbon fiber, Kevlar, and/or fiberglass.

Figure 11:
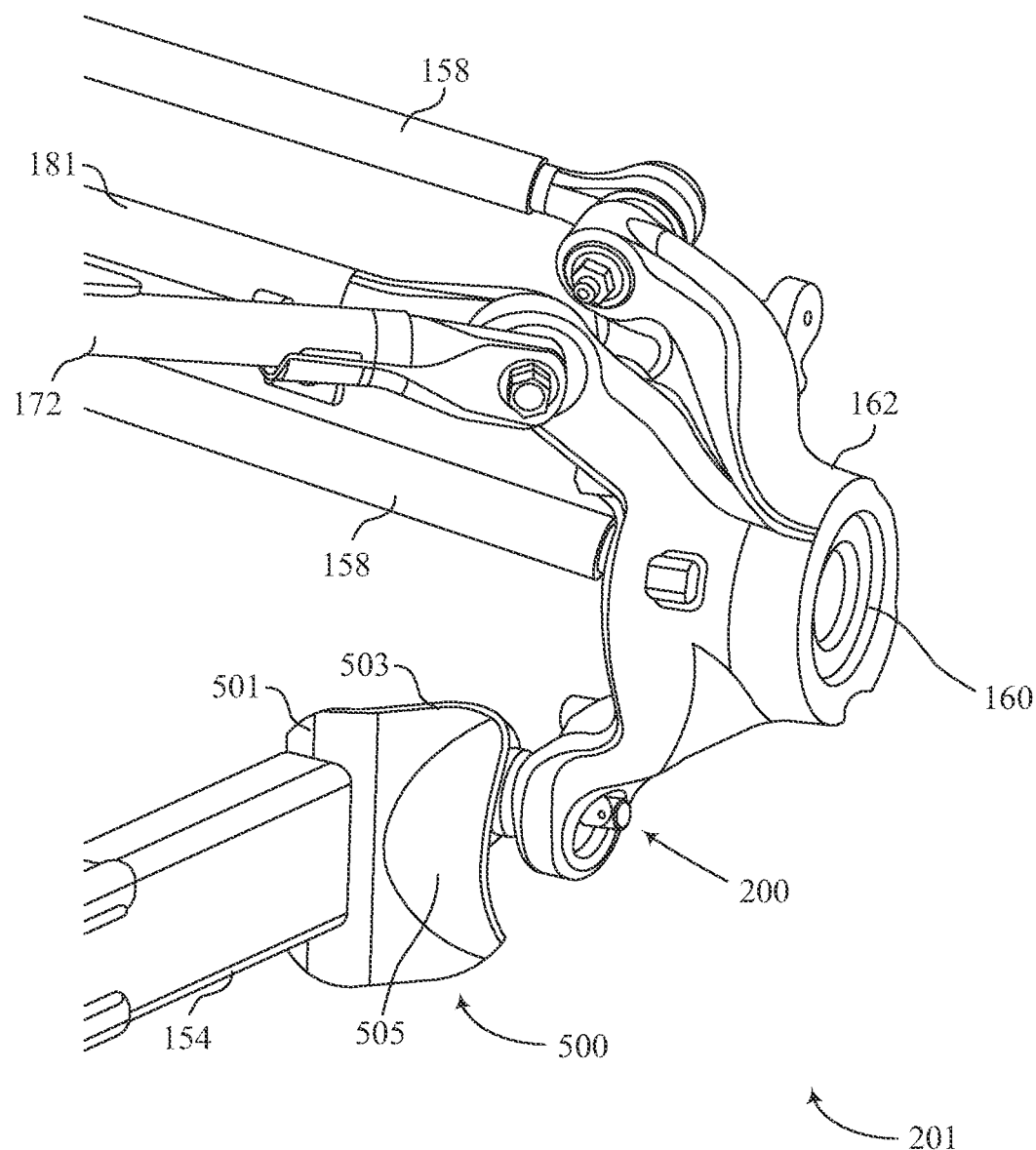
FIG. 11 is a left side perspective view of suspension components in accordance with another aspect of the disclosure.

It is noted that while the aforementioned protection element 300 as shown in FIGS. 7B, 8, and 9 includes a first portion 303, second portion 304, and third portion 304, the protection element is not limited as such. For example, as shown in FIG. 11, in accordance with other aspects of the present an example protection element 500 may include a curved first surface or shield portion 505, an attachment portion 501 that follows the contours of trailing arm 154 and a second curved surface 503 that may form an angle with respect to the attachment portion 501. The second curved surface 503 may intersect the first curved surface 505 and form an oblique angle at each point along the intersection of the second curved surface with the first curved portion 505.

In one example, the protective shield may include a first planar component 503 extending from the attachment portion 501. The protective shield may further include a second component 505 shaped to form a cavity. The cavity may include a surface opposite the cavity. The cavity may face a protected component (e.g., ball joint 200). The surface opposite the cavity may be shaped so as to direct flow and objects away from the cavity. In another example implementation, the second component 505 may form a concave surface and the convex surface opposite the concave surface. The second component may be a continuously curved surface that intersects a substantially planar surface 503.

In one example implementation, the protection element 500 may be manufactured separately form and may be later connected to the trailing arm 154 using any of the abovementioned methods—e.g., brazing, gluing, bolting, riveting, pinning, and/or may be connected to the trailing arm 154 using any known fastening method or apparatus. As another example, the protection element 500 shown in FIG. 11 may be formed as part of the trailing arm, such as through stamping or additive manufacturing. The protection element 500 may be formed of any suitable known material that is at least semi-rigid. For example, the protection element may be made of or comprise steel, aluminum, steel or aluminum alloy, plastic, a composite, which may include, for example, carbon fiber and/or Kevlar and/or fiberglass.

While in the examples discussed above, the protection element 300 and/or 500 is described with reference to the lower trailing arm 154. It is noted that the aforementioned examples of a protection element 300 and/or 500 may be used on any suspension component, which may include upper trailing arm 172 (FIGS. 2-6 and 11), for example.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A protective shield for a vehicle suspension, comprising:
    an attachment portion attachable to a vehicle suspension component, the vehicle suspension component extending in an axial direction from a first end to a second end;
    at least one shield portion attached to the attachment portion and extending laterally relative to the axial direction of the suspension component, wherein the at least one shield portion includes:
        a first planar component extending from the attachment portion; and
        a second component being shaped to form a cavity,
    wherein the cavity comprises a concave surface relative to the axial direction, the concave surface facing at least one of a suspension link mounting point, a ball joint, or a constant velocity joint, and
    wherein a convex surface opposite the concave surface is shaped so as to direct flow and objects away from the cavity.

2. The protective shield of claim 1, wherein the suspension component comprises a trailing arm.

3. The protective shield of claim 1, wherein the concave surface faces the constant velocity joint such that the protective shield directs flow and objects away from the constant velocity joint.

4. The protective shield of claim 1, wherein the concave surface faces the ball joint such that the protective shield directs flow and objects away from ball joint.

5. The suspension component of claim 1, wherein concave surface faces the suspension link mounting point such that the protective shield directs flow and objects away from the suspension link mounting point.

6. The suspension component of claim 1, wherein the first planar component and the second component are substantially perpendicular.

7. A suspension component that extends in an axial direction, the suspension component comprising:
    a first mounting portion for mounting the suspension component to a vehicle at a first end of the suspension component;
    a second mounting portion, at a second end of the suspension component for mounting the suspension component to a knuckle; and
    a protective shield formed with or attached to the suspension component and located so as to shield the second mounting portion, wherein the protective shield comprises:
    an attachment portion attachable to the vehicle suspension component:
    at least one shield portion attached to the attachment portion and extending laterally relative to the axial direction of the suspension component, wherein the at least one shield portion includes:
        a concave surface relative to the axial direction and extending from the attachment portion, and
        a convex surface opposite the concave surface,
    wherein the concave surface faces the second mounting portion, and
    wherein the convex surface opposite the concave surface is shaped so as to direct flow and objects away from the concave surface of the second component.

8. The suspension component of claim 7, wherein the concave surface is shaped so as to direct flow and objects away from at least one of a suspension mounting component at the second mounting portion, and a constant velocity joint mounted to the knuckle.

9. The suspension component of claim 8, wherein the suspension mounting component is a ball joint and the concave surface is shaped so as to direct flow and objects away from the ball joint.

10. The suspension component of claim 7, wherein the second mounting portion further comprises:
    a mounting component, wherein the mounting component comprises a mounting shaft to be mounted to the knuckle,
    wherein the mounting component permits at least three degrees of freedom of movement of the suspension component with relation to the mounting shaft, wherein the protective shield is mounted to the suspension component near the mounting component.

11. The suspension component of claim 7, wherein the suspension component comprises a trailing arm.

12. The suspension component of claim 7, wherein the suspension component further comprises a third mount for mounting at least one of a coilover and a shock.

13. The suspension component of claim 7, wherein the concave surface and the convex surface opposite the concave surface comprise a first substantially flat planar surface, a second substantially flat planar surface, and a third substantially flat planar surface.

14. The suspension component of claim 13, wherein the first substantially flat planar surface is substantially perpendicular to both the second substantially flat planar surface and the third substantially flat planar surface.

15. The suspension component of claim 7, wherein the concave surface and the convex surface opposite the concave surface comprise a continuously curved surface that intersects a substantially flat planar surface.

16. A vehicle having a rear suspension and driveline, the rear suspension comprising:
a knuckle;
a trailing arm that extends in an axial direction, the trailing arm comprising:
a first mounting portion for mounting a suspension component to the vehicle at a first end of the trailing arm;
a second mounting portion, at a second end of the trailing arm for mounting the trailing arm to the knuckle; and
a protective shield formed with or attached to the trailing arm and located so as to shield the second mounting portion, wherein the protective shield comprises:
an attachment portion attachable to the trailing arm;
at least one shield portion attached to the attachment portion and extending laterally relative to the axial direction of the trailing arm, wherein the at least one shield portion comprises:
a concave surface relative to the axial direction and extending from the attachment portion, and
a convex surface opposite the concave surface,
wherein the concave surface faces the second mounting portion and wherein the convex surface opposite the concave surface is shaped so as to direct flow and objects away from the concave surface of the second component.

17. The vehicle of claim 16, wherein the concave surface is shaped so as to direct flow and objects away from at least one of a suspension mounting component at the second mounting portion, and a constant velocity joint mounted to the knuckle.

18. The vehicle of claim 16, wherein the suspension mounting component is a ball joint and the concave surface is shaped so as to direct flow and objects away from the ball joint.

19. The vehicle of claim 16, wherein the second mounting portion further comprises:
a mounting component, wherein the mounting component comprises
a mounting shaft to be mounted to the knuckle, wherein the mounting component permits at least three degrees of freedom of movement of the trailing arm with relation to the mounting shaft, wherein the protective shield is mounted to the trailing arm near the mounting component with the concave surface facing the mounting component.

20. The vehicle of claim 16, wherein the concave surface and convex surface opposite the concave surface comprise a first substantially flat planar surface, a second substantially flat planar surface, and a third substantially flat planar surface.

* * * * *